Figure 1:
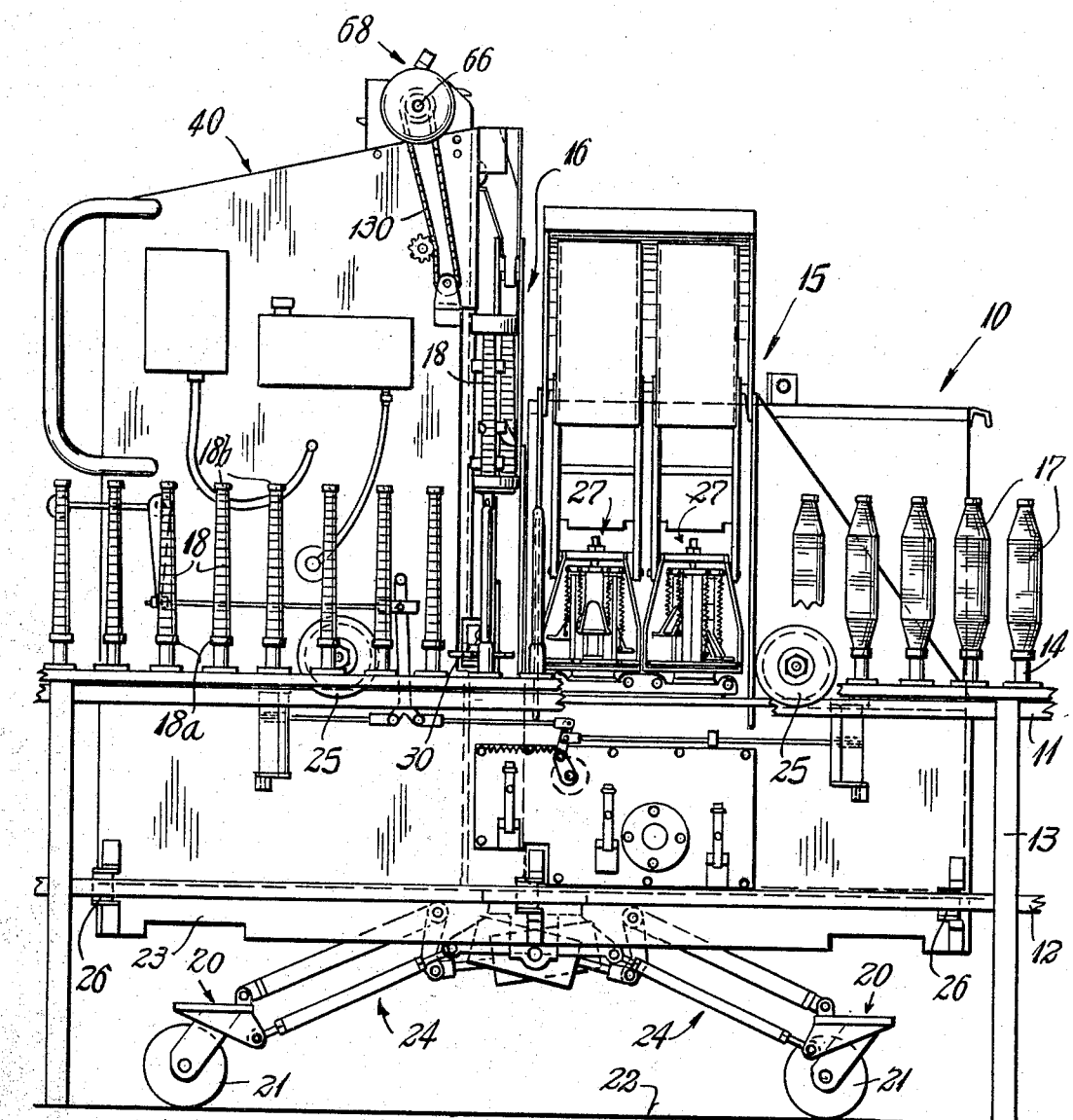

July 4, 1967   E. O. DU BUIS ETAL   3,328,948
DONNING DEVICE AND ARTICLE HANDLING MEANS THEREFOR
Filed April 2, 1965   9 Sheets-Sheet 1

INVENTORS
Edwin O. DuBuis
Edward L. Cucksey
Carl E Lindquist
BY Johnson and Kline
ATTORNEYS

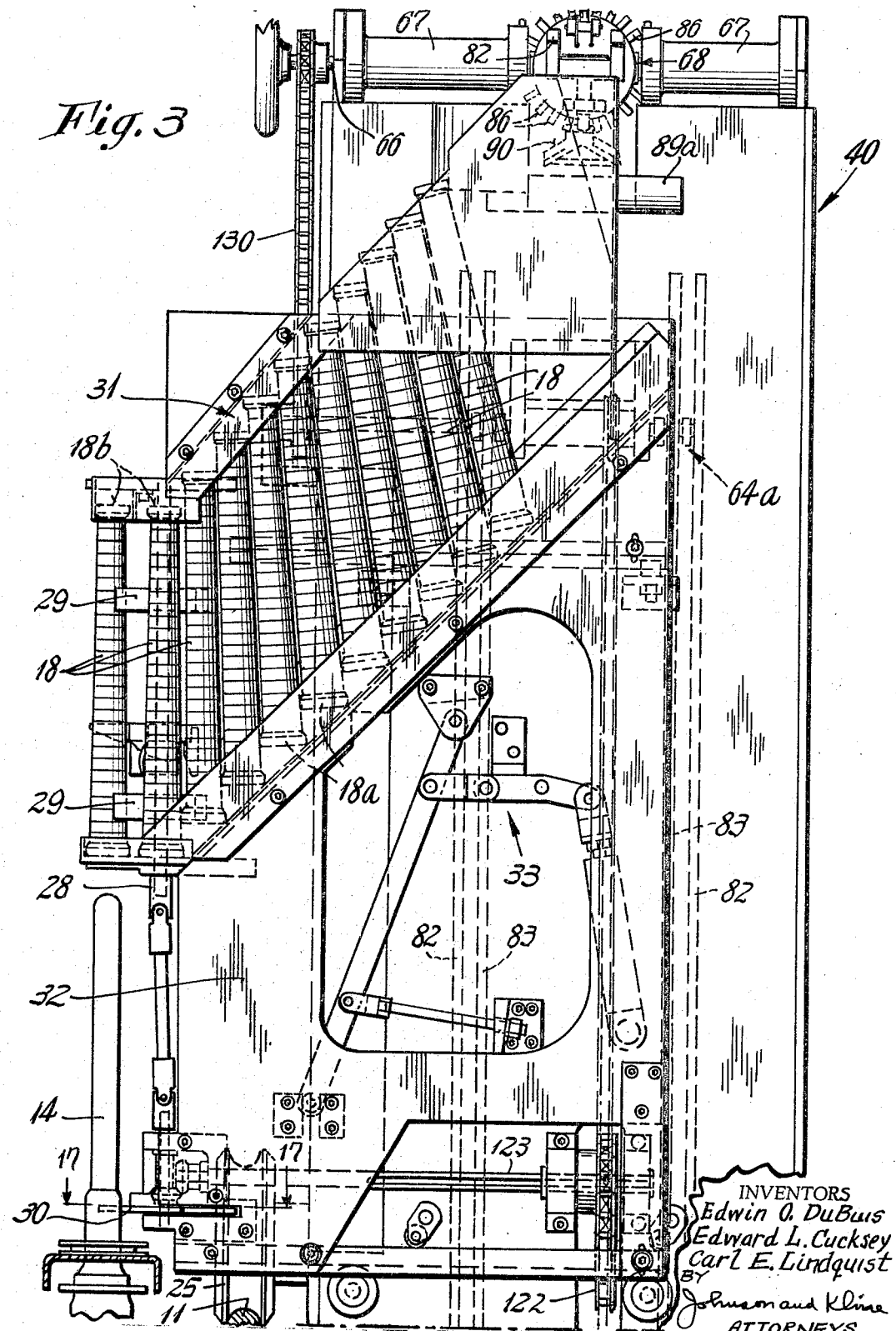

July 4, 1967 E. O. DU BUIS ETAL 3,328,948
DONNING DEVICE AND ARTICLE HANDLING MEANS THEREFOR
Filed April 2, 1965 9 Sheets-Sheet 3
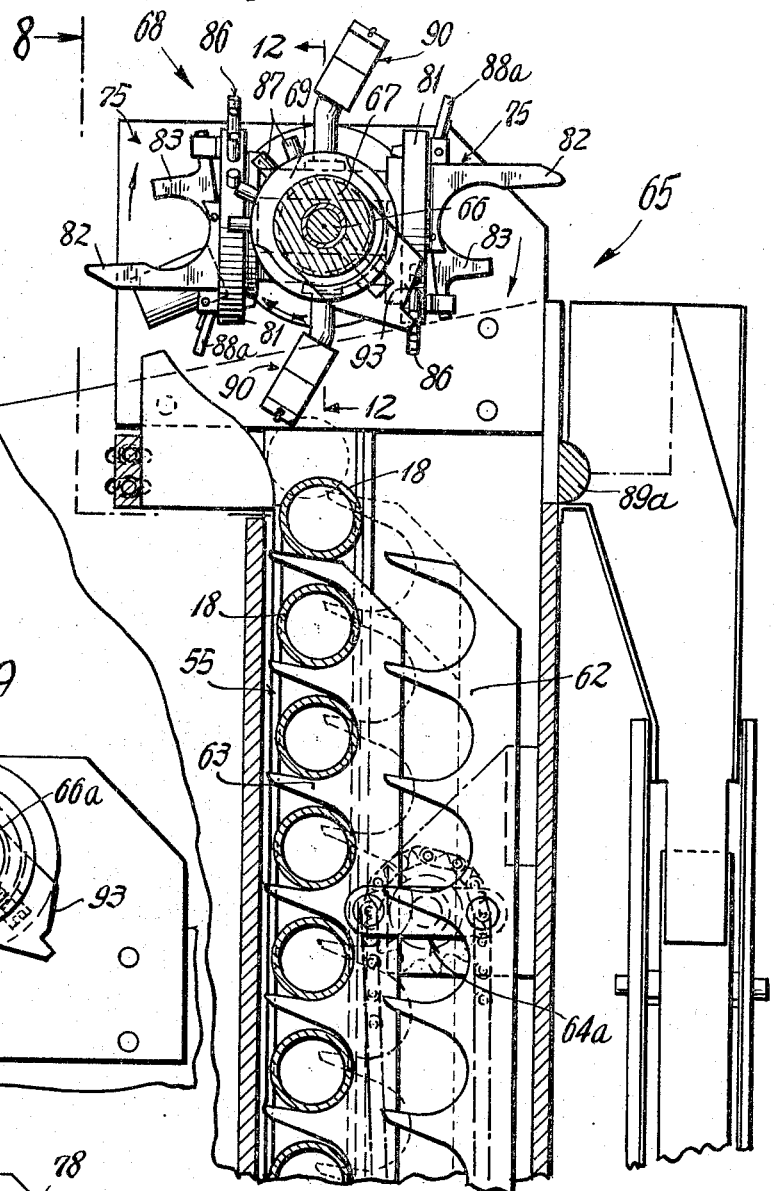
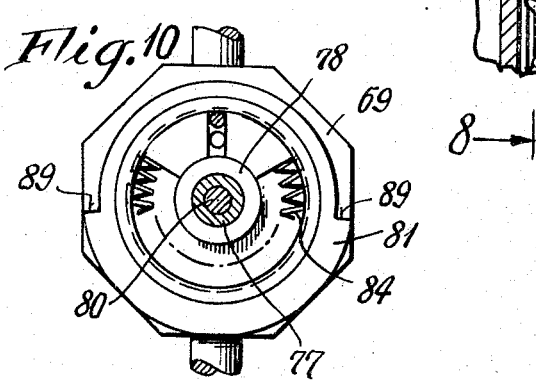
INVENTORS
Edwin O. DuBuis
Edward L. Cucksey
Carl E. Lindquist
BY Johnson and Kline
ATTORNEYS

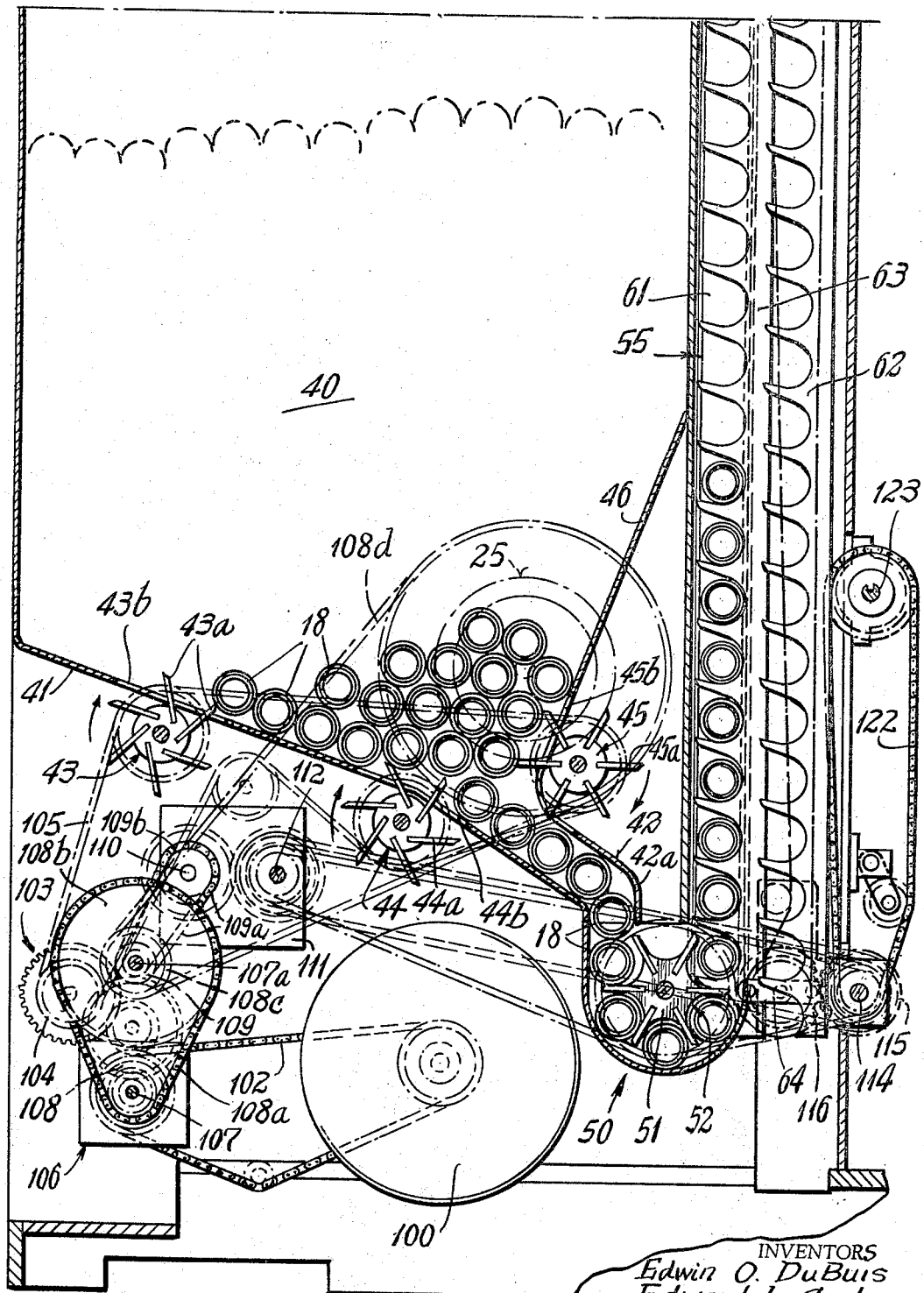

July 4, 1967 E. O. DU BUIS ETAL 3,328,948
DONNING DEVICE AND ARTICLE HANDLING MEANS THEREFOR
Filed April 2, 1965 9 Sheets-Sheet 5
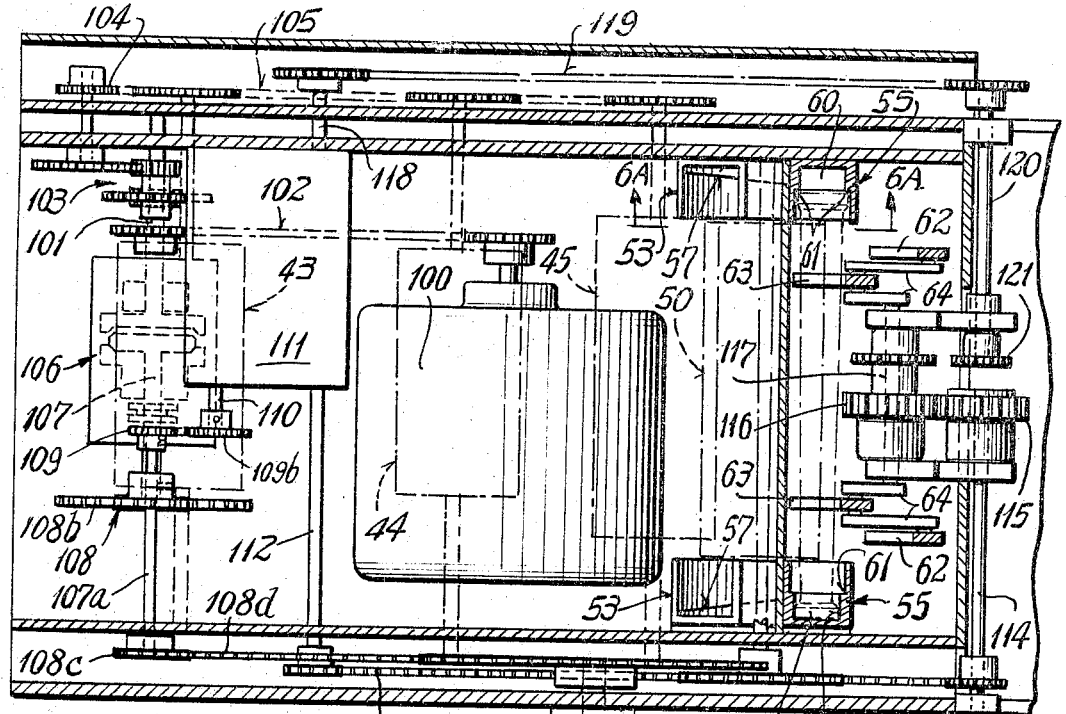
Fig. 6
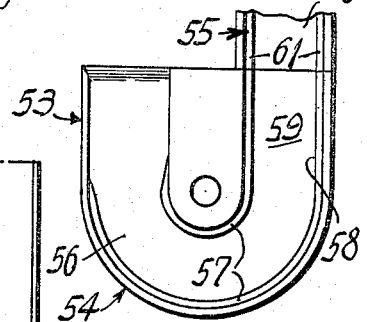
Fig. 6A
Fig. 6B
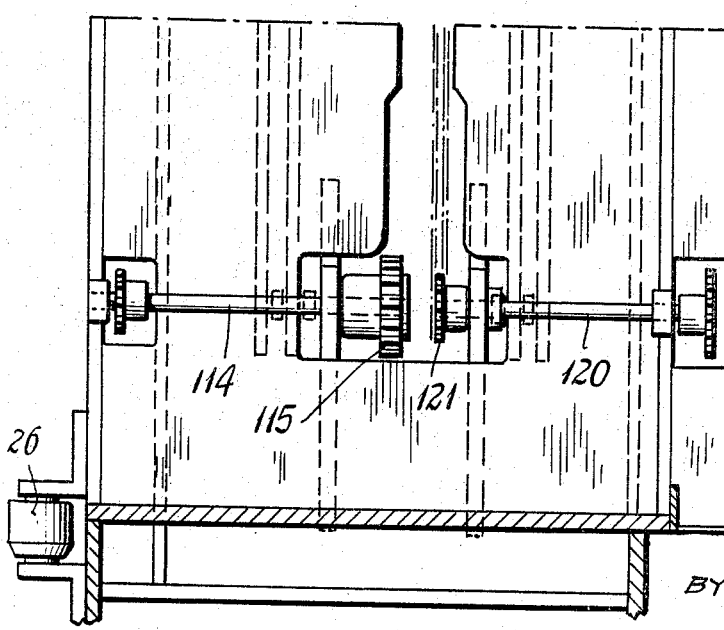
Fig. 7
INVENTORS
Edwin O. DuBuis
Edward L. Cucksey
Carl E. Lindquist
BY Johnson and Kline
ATTORNEYS

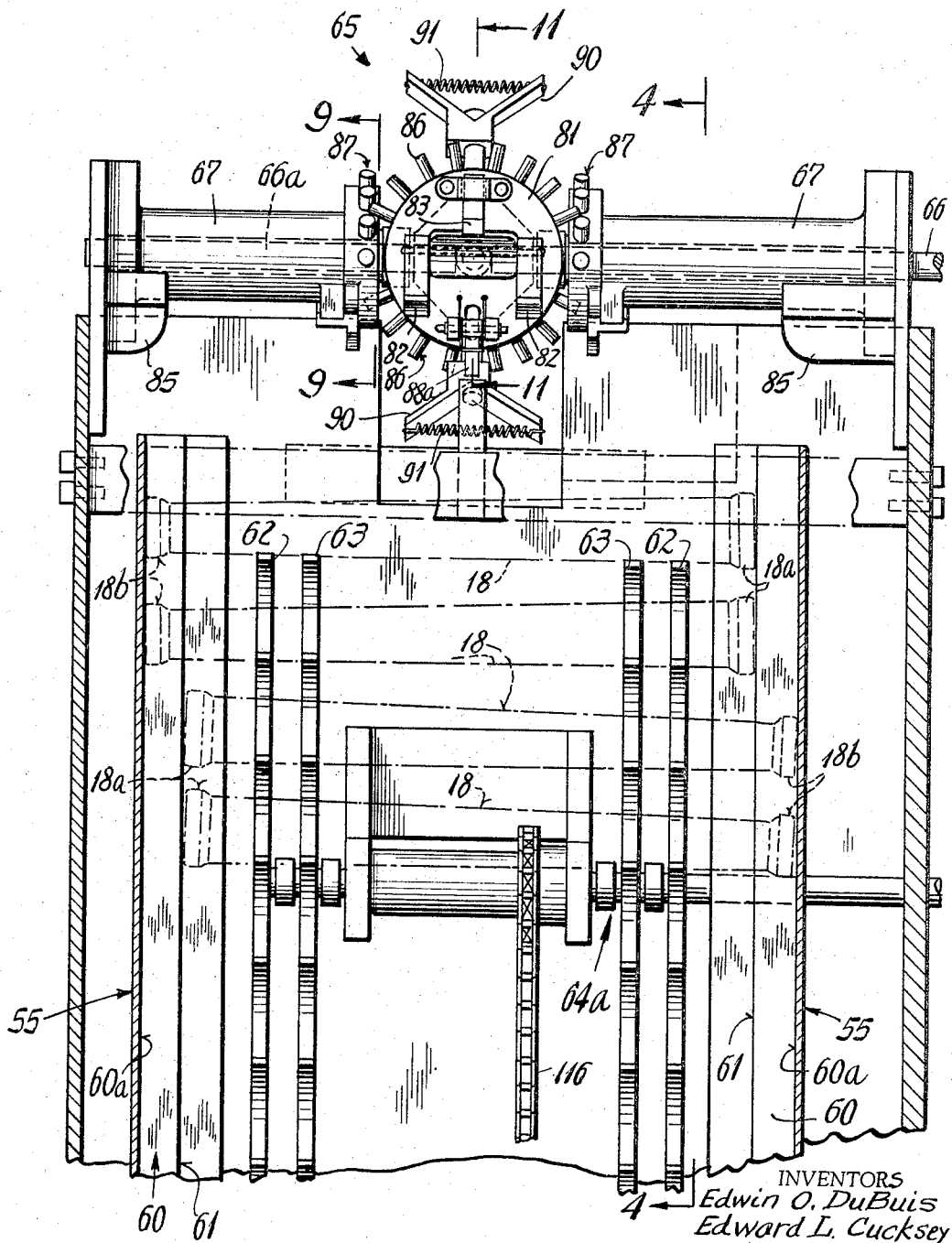

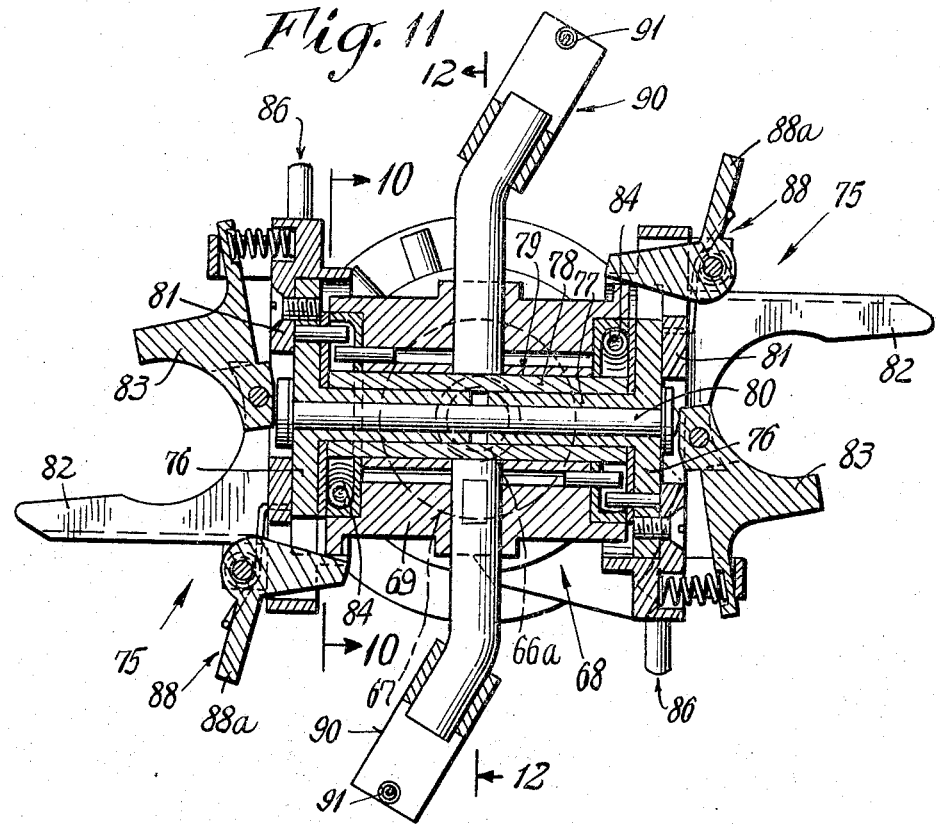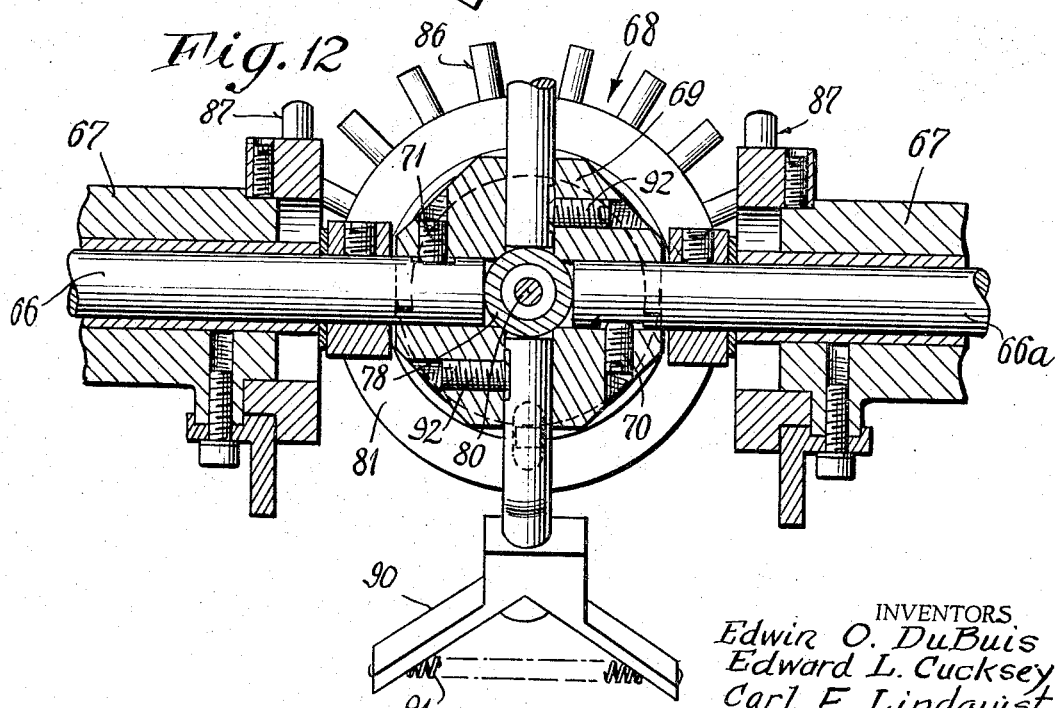

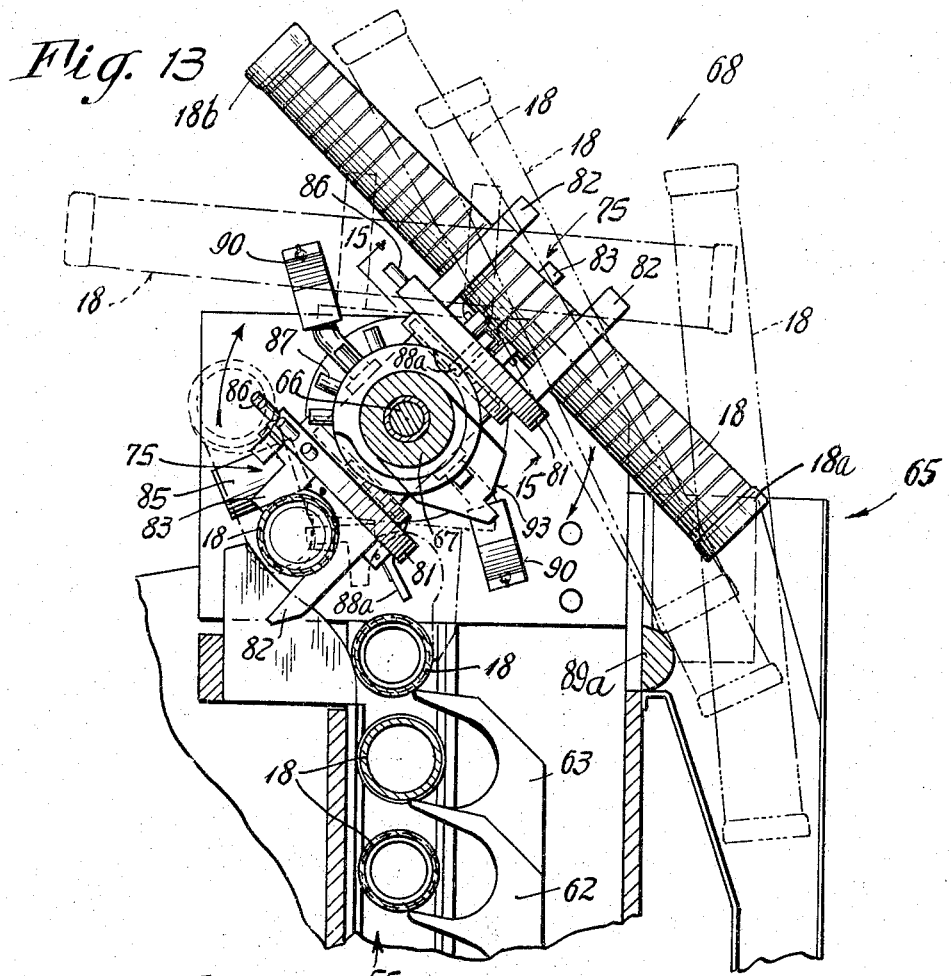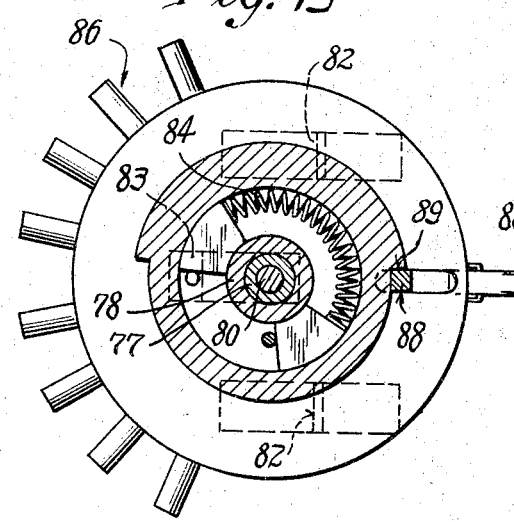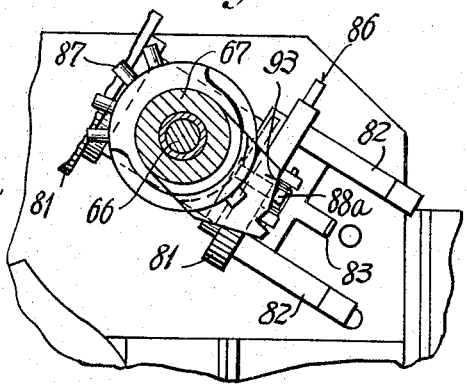

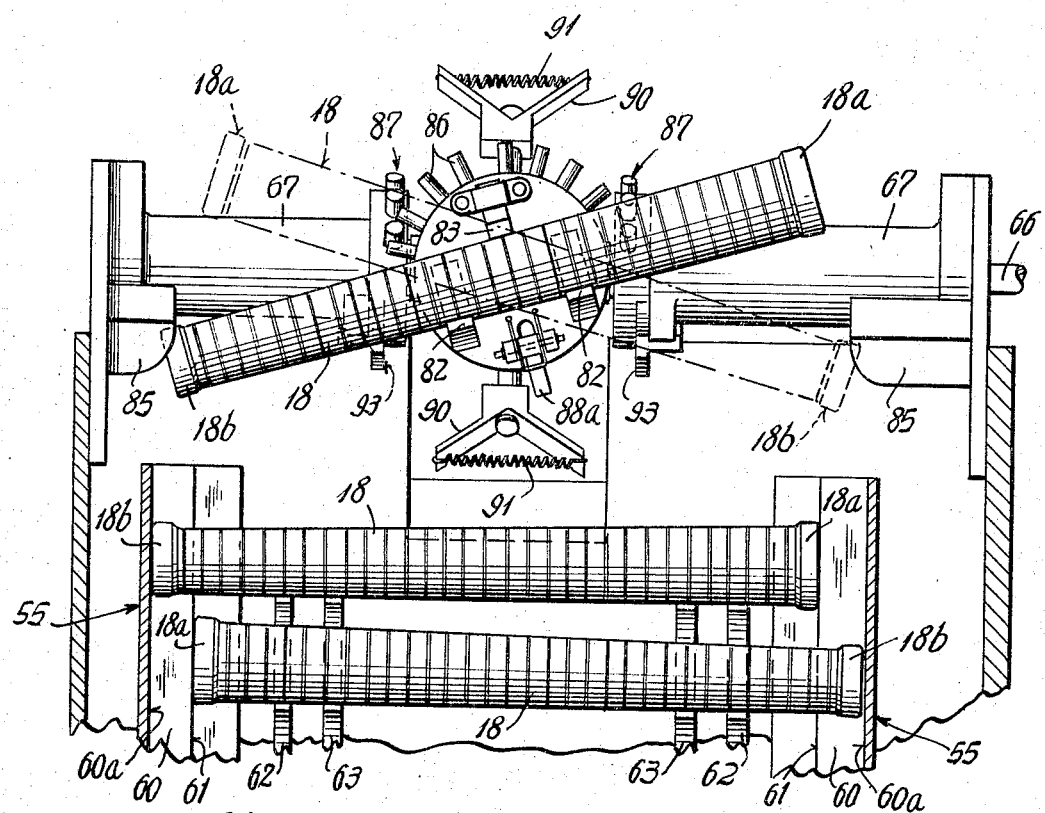
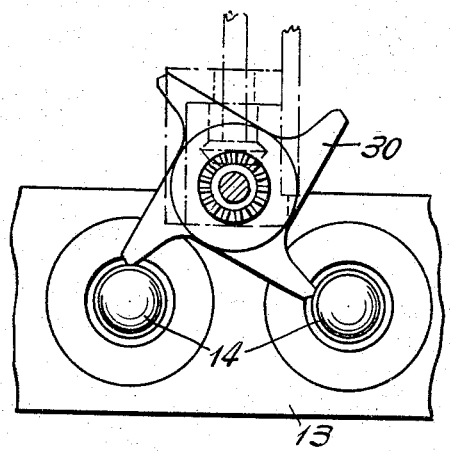
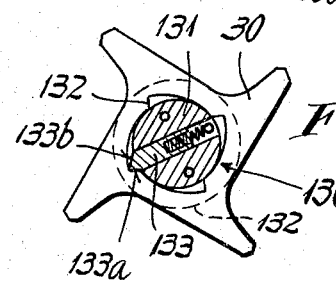
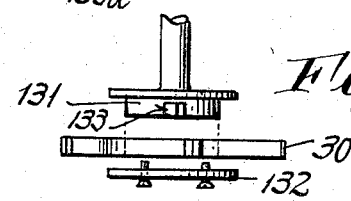

United States Patent Office

3,328,948
Patented July 4, 1967

3,328,948
DONNING DEVICE AND ARTICLE HANDLING
MEANS THEREFOR
Edwin O. Du Buis, Pearl River, Edward L. Cucksey, Upper Nyack, and Carl E. Lindquist, Nyack, N.Y., assignors to Willcox & Gibbs Sewing Machine Co., New York, N.Y., a corporation of New York
Filed Apr. 2, 1965, Ser. No. 445,031
19 Claims. (Cl. 57—53)

This invention relates to a novel article handling means and the control therefore and more particularly to an improved doffing and donning device having a unique means for supplying elongate empty bobbins having different diameters at the ends thereof to a donning means for application to a doffed spindle of a spinning machine and to means for supplying power to drive the same.

The present invention is an improvement on our patent, No. 3,164,946 granted Jan. 12, 1965. In the doffing and donning device of said patent the elongate empty bobbins having the tip and butt ends thereof of different diameters were stored in vertical alignment in demountable racks which were mounted on the carriage. The bobbins were oriented in vertical columns with the ends of the same diameter located at the same end of the rack and were fed to the donning device which was driven by contact of a star wheel thereon with the spindles on the spinning machine. The orienting and stacking of bobbins in the racks and the subsequent handling of the racks required special equipment and was a clostly operation. Also, the driving of the donning device by contact of the star wheel with the spindle, under some circumstances, placed an undue load on the spindle as might bend the spindle.

The foregoing difficulties have been overcome by the present invention by providing a vertical hopper on the carriage into which said bobbins are placed and stacked in a horizontal position with the ends of different diameter at random, feeding said bobbins from the hopper and orienting the fed bobbins and delivering them to the donning means with the ends of the same diameter in a leading position, thus eliminating the costly and time consuming operation of racking the bobbins and subsequent handling of the racks. Also, the present invention provides a power source and a power transmission device having a controller actuated by control means on the doffing device, which means is operated in accordance with the location of the spindle, for example by having a star wheel engage the spindle to be driven thereby and actuate the controller which requires but slight forces to control the operation of the power transmission to drive the supply and orienting means and the doffing means, thus reducing the load or pressures on the spindles during the operation thereof.

A feature of the invention is the novel hopper construction for feeding stacked articles therein having different diameters at the ends thereof, such as bobbins, in an orderly fashion and without jamming.

A further feature of the invention resides in the means for receiving the fed articles or bobbins one at a time and segregating and positioning them in accordance with the location of at least one of said ends.

A still further feature of the invention resides in advancing the segregated articles or bobbins to an orienting station at which an orienting unit orients the articles in accordance with their segregated position and delivers them to a receiver with a predetermined one of said ends in a leading position.

A still further feature resides in the driving of the feeding means, segregating means, advancing means and orienting means in timed relation and controlled by the control means on the donning device which is operated in accordance with the location of the spindles on the spinning machine as the doffing and donning device moves therealong.

Another feature of the invention resides in the provision of a torque amplifier for supplying the power to drive the bobbin feeding and orienting means in response to a control means actuated by a low controlling torque supplied by the star wheel as it drives the donning device.

Figure 2:
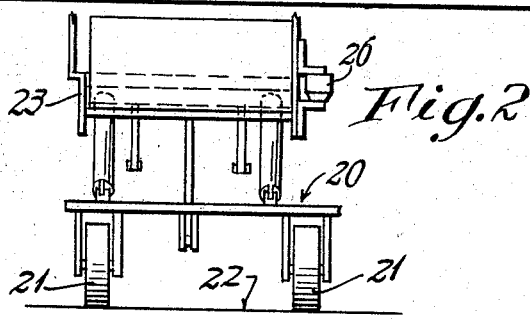

Other features and advantages of the invention will be apparent from the specification and claims when considered in connection with the accompanying drawings in which:

FIGURE 1 is a side view of a doffing and donning carriage in position on a spinning machine.
FIG. 2 is an end view of the lower part of the carriage.
FIG. 3 is a front view of the bobbin donning device.
FIG. 4 is a sectional view taken along line 4—4 of FIG. 8.
FIG. 5 is a sectional view through the lower part of the hopper and feed means.
FIG. 6 is a horizontal sectional view showing the drive means in position on the carriage.
FIG. 6A is a sectional view taken along line 6A—6A of FIG. 6.
FIG. 6B is a top view of the device shown in FIG. 6A.
FIG. 7 is a front view of FIG. 6.
FIG. 8 is a view partly in section taken along line 8—8 of FIG. 4.
FIG. 9 is a view taken along line 9—9 of FIG. 8.
FIG. 10 is a view take along line 10—10 of FIG. 11.
FIG. 11 is a section taken along line 11—11 of FIG. 8.
FIG. 12 is a section taken along line 12—12 of FIG. 4.
FIG. 13 is a view of the orienting station similar to FIG. 4 showing the movement of the bobbin by the orienting unit.
FIG. 14 is a view similar to FIG. 8 showing the bobbin initially rotating the head.
FIG. 15 is a sectional view on line 15—15 of FIG. 3 of the head partly in section showing the return spring compressed and head latched in rotated position on the unit.
FIG. 16 is a partial view similar to FIG. 13 showing the unit in latch releasing position.
FIG. 17 is a sectional view taken along line 17—17 of FIG. 3.
FIG. 18 is a view of the star wheel partly in section showing the ratchet drive.
FIG. 19 is an exploded view of the star wheel assembly.

The present invention includes a novel means for handling elongate articles each of which has a large end and a small end, i.e., in transverse dimension. The articles are stacked in side-by-side relation with the large and small ends located at random and are fed from the stack one at a time. The fed articles are positioned and segregated in accordance with the size of the ends thereof and the segregated articles are then oriented and transferred to a receiver with a predetermined one of said ends in a leading position. This is particularly useful in supplying empty bobbins to a donning device for donning bobbins to doffed spindles on a spinning machine or the like and will be so illustrated herein.

As shown in the drawings, the present invention is illustrated with a doffing and donning device of the type shown in our Patent 3,164,946 which comprises a carriage 10 adapted to be mounted on rails 11, 12 carried by the side of the spinning frame 13 having a succession of spindles 14 extending therealong and to carry a suitable doffing means 15 and a donning means 16 in spaced relation thereto so as to automatically doff full bobbins or wound packages 17 from the spindles and replace them with empty bobbins 18 as the carriage is moved along the side of the spinning frame. The bobbins 18 as herein illustrated are uniformly tapered warp bobbins which have a butt 18a of enlarged diameter and a tip 18b of a smaller diameter. The bobbins have the usual driving fit with the spindle.

The carriage has a rigid subframe 20 upon which are mounted four floor-engaging wheels or rollers 21 whereby the carriage can be readily rolled over the floor 22 of a mill and to a position adjacent the spinning frame. The carriage has a main frame 23 connected to the subframe by suitable lifting mechanism 24 whereby it can be raised to a position in which a pair of rail-engaging wheels 25 are located on the upper part thereof and can be supported on the upper rail 11 extending across the spinning frame for movement therealong. The carriage also is provided with stabilizing rollers 26 which engage the side of the lower rail 12 to steady the device when it is supported on the rails for movement along the frame.

The doffing device 15 comprises a plurality of doffing units 27 of any suitable type. Those herein disclosed are of the type described and claimed in Patent 3,070,949 and are adapted to eject the full bobbins from the spindles in response to the movement of the carriage along the frame.

The donning device 16 herein illustrated is of the type disclosed in the first-mentioned patent and has a shaft 28 carrying bobbin-engaging members 29. The shaft is driven by a star wheel 30 through engagement with the spindles 14 on the spinning machine for rotating the same once for each spindle to apply an empty bobbin thereto from an inclined bobbin receiver 31. As shown in FIG. 3, the shaft 28 and receiver are carried by a plate 32 movable from a retracted position to a projected position by suitable linkage means 33 as described in said first-mentioned patent.

Mounted on the carriage also is the novel bobbin supply means for storing a plurality of empty bobbins and feeding them to the receiver 31 on the donning device which will supply the donning device with empty bobbins during the operation of the doffing and donning device. This supply means, according to the present invention, comprises a hopper 40 which is mounted on the carriage to the rear of the donning device. The hopper is of a width slightly greater than the length of the bobbin to be used and in which the tapered bobbins are stacked in a horizontal side-by-side relation with their ends positioned at random. This eliminates the necessity of racking the bobbins to properly orient them. As shown in FIG. 5, the bottom 41 of the hopper is downwardly inclined and terminates in an opening in the form of a curved chute 42 having a cross-section forming a labyrinth which closely confines the bobbin so as to control it in its passage through the chute to a feeding device. In order to move the bobbins along the inclined bottom toward the chute, a pair of impeller or feeding wheels 43, 44 are provided. These wheels each have a plurality of paddles 43a, 44a which project through openings 43b, 44b in the bottom and into contact with the bobbins. The wheels rotate in the direction of the arrows and move the bottom layer of bobbins toward the chute 42. In addition to feeding the bobbins along the inclined bottom, there is a tendency of the paddle wheels to jog the bobbins to cause them to flow evenly. This jogging action can be seen at wheel 44 in FIG. 5.

In order to prevent "log jams" from forming at the opening, the hopper is also provided with a paddle wheel 45 which is located in the front wall 46 with paddles 45a extending through opening 45b and engaging the bobbins above the layer passing into the chute. This wheel is arranged so as to be out of phase with the feeding wheels 43, 44 in the bottom of the hopper and is rotated in the opposite direction to the movement of the bobbins into the chute and will further agitate the bobbins in the stack. It will also move any bobbins that may be moving in a second layer toward the chute in the opposite direction of the feed to break up any jams which might occur at the chute.

As the bobbins pass through the chute, they engage the end wall 42a which properly positions the bobbin to drop to the bobbin feeding device 50 for feeding bobbins from the hopper one at a time. This feeding device 50 comprises a paddle wheel 51 having a plurality of pockets 52 thereon to receive the bobbins one at a time and move them through substantially 180° with their ends disposed in opposed substantially U-shaped guide channels 53 having portions 54 concentric to the axis of rotation of said paddle wheel. As the bobbins are carried by the paddle wheels, they are segregated by a segregating means in accordance with the diameters at the ends thereof and fed to vertical guide channels 55.

In the illustrated form of the invention the segregating is accomplished, as best shown in FIGS. 6, 6A, 6B, by having on the bottom portion 56 of the U-shaped guide channels 53 inclined cam surfaces 57 which will be engaged by the largest end of the bobbin and will shift the bobbin longitudinally in the direction of the top end thereof, thus displacing the tip with respect to the center line between the guide channels. As shown in FIG. 6, the opposed side surfaces 58 of the inclined cam surfaces form a center channel 59 which will guide the tip as it moves longitudinally.

After the bobbins have been segregated and displaced in accordance with the end diameter, they are fed out of the segregator cam structure and into the vertically extending guide channels 55 which have a central tip-receiving depression or channel 60 aligned with the channel 59 and with the surfaces 61 on either side aligned with the surfaces 57 and arranged to receive the butt of the longitudinally displaced segregated bobbins. As shown in FIG. 8, the space between the surface 60a on one vertical guide channel and the surface 61 on the other vertical guide channel equals the length of the bobbin and will hold it in its longitudinally displaced position. The thus segregated bobbins are fed along the vertical guide channels by a pair of alternately operating feed racks 62, 63 of the type shown in the said first-mentioned patent which are actuated by driven upper and lower eccentrics 64, 64a to progressively move the segregated and longitudinally displaced bobbins along the vertical guide tracks to an orienting station 65 located at the upper end thereof wherein the segregated bobbins are oriented in accordance with the displacement thereof and fed butt first to the receiver 31.

In the orienting station there is positioned a transverse rotary split shaft 66, 66a mounted to rotate in frame members 67 and having an orienting unit 68 mounted thereon. As shown in FIG. 12, the hub or body 69 of the unit is secured to the ends of the split shaft by set screws 70, 71. As shown in FIG. 4, the unit rotates on an axis parallel to the axis of the bobbins on the vertical guides.

The unit is provided with one or more orienting heads thereon. In the illustrated form of the invention the orienting unit has a pair of orienting heads 75 on opposite sides of the hub which are mounted to oscillate on the unit on an axis perpendicular to the axis of said shaft 66, 66a. The heads are diametrically opposed and since they are identical only one will be described in detail. As shown in FIG. 11, the head includes a flat plate 76 having a sleeve 77 rotatable in a bearing 78 in a bore 79 in the hub which is perpendicular to the shaft 66 and the heads are secured in position on the hub by a shaft or through bolt 80 passing through the sleeves. The flat plate 76 has a disk 81 secured thereto which has projecting therefrom a bobbin-engaging finger 82 and a cooperating spring latch 83 adapted to releasably hold a bobbin on the head.

As shown in FIG. 4, the shaft 66 is mounted in a plane including the plane of, or in a plane parallel to the plane of, the vertical guides which are carrying the segregated bobbins so that the finger 82 will automatically engage the upper bobbin in the vertical guide and the latch will operate to clamp the bobbin thereto for movement therewith. The head is normally maintained in a position in which the finger 82 and latch 83 will pick up a bobbin in the vertical guide by means of a spring 84 disposed between the head and the hub of the unit. As the unit is rotated by the shaft 66, 66a, the bobbin will be carried by the head through an arc and the tip end of the displaced bobbin will engage one or the other of the pads 85, as shown in FIG. 14, which will retard the movement of the tip by the unit, thus resulting in a rotary movement of the head about its axis and against the urging means 84. This rotation of the head will cause pins 86 fixedly carried by the head to move into cooperative relation with fixed pins or a crown gear 87 secured to the frame 67 and disposed adjacent each side of the unit, as shown in FIG. 14, so that continued movement of the unit will cause the crown gear 87 to rotate the head and bobbin carried thereby with respect to the unit through substantially 90° and will cause the butt end of the bobbin to be disposed in a leading position as shown in FIG. 13. As the head is rotated, it will charge the spring 84 and when the bobbin reaches the 90° position, the head will be latched in this position against the return action of spring 84 by a spring-urged latch 88 (FIGS. 11, 15) on the head engaging a shoulder 89 on the unit.

As the orienting unit rotates with its shaft, it carries the bobbin through an arc, as indicated by the dot and dash positions in FIG. 13, until the butt end of the bobbin engages a stripper bar 89a located at the mouth of the receiver 31 so that continued movement of the unit will strip the bobbin from the finger 82 and clamping latch 83 and at the same time a yoke 90 carrying a spring 91 and mounted on the orienting unit by screws 92 to project therefrom for movement therewith, as shown in FIGS. 11–14, will engage the opposite end of the bobbin and move it into a vertical position in response to the continued rotation of the unit so that the bobbin can drop into the receiver.

After the bobbin has been released from the head, continued movement of the unit will cause a portion 88a of the latch 88 to engage a fixed cam 93 (FIG. 16) which will cause the latch to move out of engagement with the shoulder so that the head returns automatically under the urging of the spring 84 to its normal position ready to pick up another bobbin from the guide and move it through the cycle of operation just explained.

A feature of the bobbin supply means of the present invention resides in a novel drive means on the carriage for operating the rotary elements in the hopper for advancing the bobbins toward the opening therein, the device for preventing jamming of the bobbins, the feed device for removing the bobbins one at a time from the hopper, the feed rakes for advancing the bobbins along the vertical guides, and the shaft carrying the orienting unit.

While the drive means could obtain power from one of the rail engaging wheels or the star wheel for the donning device, it is at present preferred to drive the components by an electric motor 100 carried on the carriage and energized by any suitable means, such as a cable and take-up reel (not shown).

As shown in FIGS. 5 and 6, the motor 100 drives a shaft 101 by a chain 102. The shaft 101, through suitable gearing 103, drives a sprocket 104 which through chain 105 drives the impeller or feed wheels 43, 44 and the paddle wheel 45 (FIG. 5) so that as soon as the motor is turned on, the wheels will act on the bobbins to jog them and to advance them toward the opening to be ready to feed from the hopper under control of the bobbin feeding device 50. A clutch device 106 connects the shaft 101 to a shaft 107 having a sprocket 108 thereon for driving a chain 108a to sprocket 108b on a shaft 107a having a sprocket 108c driving, by a chain 108d, the rail engaging wheel 25 to move the carriage along the spinning machine. The shaft 107a also through sprocket 109 drives a chain 109a and a sprocket 109b on the power input shaft 110 of a suitable torque amplifier 111. The output shaft 112 of the torque amplifier supplies power by chain 113 to drive the feeding device 50 and shaft 114 which through gears 115, 116 and shaft 117 drive the eccentrics 64, 64a for operating the feeding racks 62, 63. The shaft 66 is driven by a chain 130 from the shaft operating the eccentric drive 64a (FIGS. 1 and 3). The operation of the output shaft of the torque amplifier is controlled by the control input shaft 118 which is driven by a chain 119 from the shaft 120. Shaft 120 has a sprocket 121 which is driven by a chain 122 from the shaft 123 (FIG. 3) and driven by the star wheel 30 of the donning device through suitable gearing in response to the engagement of the wheel with the spindles as the carriage moves along the row of spindles on the spinning machine. With this arrangement a light pressure of the star wheel on the spindle will rotate the shaft 28 of the donning device, and also through the chain drive, the control input shaft of the torque amplifier. This will cause the output shaft to deliver sufficient power provided by the input thereto to feed the bobbins from the hopper, deliver them to the orienting station, and deliver them to the receiver all in timed relation with the movement of the carriage along the spinning machine and the detection of the spindles by the donning device as the same moves past the spindles. Further, since the power for operating the feeding, conveying and orienting means is supplied by the motor through the torque amplifier in response to a light torque applied to the control input by star wheel 30, the danger of damage to the spindles by the engagement of the star wheel therewith is substantially reduced.

As a further precaution, the star wheel 30 can be connected to its shaft 28 by means of a releasable connection 130 as shown in FIGS. 18 and 19 in which the star wheel is rotatably mounted on a hub 131 and is provided with spaced ratchet teeth 132 as shown in FIG. 18. A spring-pressed pawl 133 is carried in the hub 131 to cooperate with the ratchet and form the driving connection to the star wheel which is held in position by a plate 132 as shown in FIG. 19. The pawl is provided with two different slopes 133a, 133b for engaging the ratchet teeth which are also shaped as shown in FIG. 18 so that the star wheel can drive the shaft 28 and control input in one direction by the engagement thereof with the spindles as shown in FIG. 17 and will release upon an overload being applied thereto. As the carriage moves in the other direction, because of the long slopes on the pawl and ratchet, the ratchet will readily release the star wheel 30 for rotation on the hub to permit the carriage to move backward without damaging the spindles or other mechanism.

Variations and modifications may be made within the scope of the claims and portions of the improvements may be used without others.

We claim:

1. A doffing and donning machine comprising a carriage movable along a side of a spinning machine having a row of spindles thereon; a rotatable donning device mounted on the carriage for applying empty bobbins to doffed spindles including control means operable in response to the position of the spindle and a receiver for holding bobbins to be donned; supply means on the carriage including a bobbin feeding means for supplying empty bobbins to said receiver; power supply means on the carriage; and a power transmitting means driven by said power supply means and having a controller thereon for driving the feeding means with said control means operating the controller to cause the power transmitter to operate said feeding means in response to the location of said spindles.

2. A doffing and donning machine comprising a carriage movable along a side of a spinning machine having a row of spindles thereon; a rotatable donning device mounted on the carriage and having a receiver for holding empty bobbins and a control means to engage and be driven by the spindles as the carriage moves along the machine to cause said donning device to apply empty bobbins to doffed spindles; bobbin supply means on the carriage including a bobbin feeding means and orienting means for supplying empty bobbins to said receiver; and a drive means on the carriage including a torque amplifier having a controller thereon driven by the low torque supplied by said control means as it drives the donning device for supplying the power to drive the said feeding means and orienting means, said control means causing the torque amplifier to operate the feed means and orienting means to supply a bobbin for each operation of the donning device and without undue pressure of the control means against the spindle.

3. A doffing and donning machine comprising a carriage movable along a side of a spinning machine having a row of spindles thereon; a rotatable donning device mounted on the carriage for applying empty bobbins to doffed spindles including a receiver for holding bobbins to be donned; means for supplying and orienting said bobbins and feeding them to said receiver in a predetermined oriented position comprising a hopper to receive a plurality of horizontally stacked elongate bobbins having different diameters at each end thereof in side-by-side relation with the different ends thereof disposed at random; means delivering said bobbins from the hopper one at a time; segregating means including opposed guide channels for receiving the fed bobbins and positioning them with a predetermined longitudinal displacement with respect to the center of the space between said opposed guide channels in accordance with the end diameters; means advancing the segregated bobbins to an orienting station; and means in the orienting station including an orienting head engaging the segregated bobbins and moving them in a predetermined path depending upon the segregation thereof to feed said bobbins to said receiver with a predetermined one of said ends in a leading position.

4. A doffing and donning machine comprising a carriage movable along a side of a spinning machine having a row of spindles thereon; a donning device mounted on the carriage having a rotatable bobbin engaging member for applying empty bobbins to doffed spindles and having a control means therefor operable in response to the location of the spindles, said donning device including a receiver for holding bobbins to be donned; means for supplying and orienting elongate bobbins having different diameters at the ends thereof and feeding them to said receiver in a predetermined oriented position comprising a hopper to receive a plurality of horizontally stacked bobbins in side-by-side relation with the different ends thereof disposed at random; rotatable means delivering said bobbins from the hopper one at a time; segregating means including opposed guide channels for receiving the fed bobbins and positioning them with a predetermined longitudinal displacement in accordance with the end diameters; feed means advancing the segregated bobbins to an orienting station; means in the orienting station including a driven orienting head engaging the segregated bobbins and moving them in a predetermined path depending upon the segregation thereof to feed said bobbins to said receiver with a predetermined one of said ends in a leading position; and power transmitting means having a controller thereon being operable to drive the rotatable means for feeding the bobbins from the hopper, the feed means and the orienting device when the control means on the donning device operates the controller in response to the location of said spindles to apply a bobbin to the spindle and to feed a bobbin to the receiver.

5. A doffing and donning machine comprising a carriage movable along a side of a spinning machine having a row of spindles thereon; a rotatable donning device mounted on the carriage for applying empty bobbins to doffed spindles including control means operable in response to the position of the spindle and a receiver for holding bobbins to be donned; means for supplying and orienting a plurality of elongate bobbins having different diameters at the ends thereof and feeding them to a receiver in a predetermined oriented position comprising a vertical hopper having a width to receive a stacked supply comprising a plurality of horizontally disposed bobbins in side-by-side relation with the different ends thereof located at random, said hopper having an outlet opening in the bottom and a rotary bobbing feeding means in the bottom of the hopper for feeding the bobbins toward said opening; means comprising a driven paddle wheel adjacent said outlet opening to receive bobbins therefrom and deliver said bobbins one at a time to a segregating means, said segregating means comprising opposed U-shaped guide channels having cam means disposed at the ends of said paddle wheel for engaging the ends of said bobbins carried by the paddle wheel and longitudinally displacing the bobbins relative to the center between said guide channels in accordance with the end diameters of said bobbins, each of said channels having a center portion to receive the ends of smaller diameter and an outwardly spaced surface on each side of the center portion to receive the ends of larger diameter, the spacing between the center portion of one guide channel and said outwardly spaced surface of the other guide channel being in excess of the length of said articles; vertical guide channels for receiving said segregated bobbins; a driven conveyor means engaging and advancing the segregated bobbins carried by said vertical guide channels to an orienting station; means in the orienting station including an orienting head engaging the segregated bobbins and moving them in a predetermined path depending upon the segregation thereof to feed said bobbins to said receiver with a predetermined one of said ends in a leading position; power drive means on the carriage; and a power transmission means driven by said power drive means and having a controller thereon for driving the means for feeding and orienting bobbins with said control means actuating the controller to cause the power transmitted to drive said means in response to the location of said spindles.

6. A doffing and donning machine comprising a carriage movable along a side of a spinning machine having a row of spindles thereon; a rotatable donning device having a receiver mounted on the carriage for applying empty bobbins to doffed spindles; means on the carriage for supplyings and orienting a plurality of bobbins having predetermined characteristics at the butt and tip ends thereof and feeding them to said receiver in a predetermined oriented position comprising a vertical hopper to receive a plurality of stacked bobbins in horizontal side-by-side relation with the tip and butt ends thereof disposed at random; means delivering said bobbins from the hopper one at a time; segregating means including opposed cam means and guide channels receiving the fed bobbins and longitudinally displacing said bobbins with respect to the center between said guide channels in accordance with the end characteristics; means advancing the segregated bobbins to an orienting station; and means in the orienting station including an orienting head engaging the segregated bobbins and moving them in a predetermined path depending upon the longitudinal displacement thereof to feed said bobbins to said receiver with a predetermined one of said ends in a leading position.

7. A doffing and donning machine comprising a carriage movable along a side of a spinning machine having a row of spindles thereon; a rotatable donning device having a receiver mounted on the carriage for applying empty bobbins having different diameters at the ends thereof to doffed spindles; bobbin supply means on the carriage including means for segregating and longitudinally displacing the bobbins in accordance with the end diameters thereof, spaced guide channels for feeding said segregated bobbins to an orienting station on the carriage, and means in the orienting station including an orienting unit on a driven shaft disposed parallel to a plane containing said guide channels, said unit having an oscillating orienting head movable about an axis located in a plane perpendicular to said first plane and having gripper means to engage and grip the segregated bobbins, said head being urged to a predetermined bobbin engaging position by urging means; means engaging the gripped displaced bobbin during the initial movement of the unit whereby the head is initially turned on the said axis against said urging means in a predetermined direction depending upon the position of the segregated bobbin, said unit having means for continuing turning of the head against said urging means through 90° incident to the rotation of the unit and carrying the bobbin to a position with said predetermined end aligned with a receiver; and means for releasing the bobbin from the gripping means and the head for return to said normal position by the urging means.

8. Means for supplying and orienting elongate articles having different transverse dimensions at the ends thereof and feeding them to a receiver in a predetermined oriented position comprising a hopper to receive a plurality of articles in side-by-side relation with the different ends thereof disposed at random; means delivering said articles from the hopper one at a time; segregating means receiving the fed articles and positioning them in accordance with the end dimensions; means advancing the segregated articles to an orienting station; and means in the orienting station including an orienting head engaging the segregated articles and moving them in a predetermined path depending upon the segregation thereof to feed said articles to a receiver with a predetermined one of said ends in a leading position.

9. Means for supplying and orienting elongate articles having different transverse dimensions at the ends thereof and feeding them to a receiver in a predetermined oriented position comprising a hopper to receive a plurality of stacked articles in side-by-side relation with the different ends thereof disposed at random; driven means delivering said articles from the hopper one at a time; segregating means receiving the fed articles and positioning them in accordance with the end dimensions; driven advancing means advancing the segregated articles to an orienting station; means in the orienting station including a driven orienting head engaging the segregated articles and moving them in a predetermined path depending upon the segregation thereof to feed said articles to a receiver with a predetermined one of said ends in a leading position; and means driving said driven means, driven advancing means and driven orienting head in predetermined timed relation.

10. Means for supplying and orienting elongate articles having different transverse dimensions at the ends thereof and feeding them to a receiver in a predetermined oriented position comprising a vertical hopper having a width to receive a stacked supply comprising a plurality of horizontally disposed articles in side-by-side relation with the different ends thereof located at random, said hopper having an outlet opening in the bottom and a rotary article feeding means in the bottom for feeding the articles toward said opening; means adjacent said outlet opening to deliver said articles from the hopper one at a time; segregating means receiving the fed articles and positioning them in accordance with the end dimensions; means advancing the segregated articles to an orienting station; and means in the orienting station including an orienting head engaging the segregated articles and moving them in a predetermined path depending upon the segregation thereof to feed said articles to a receiver with a predetermined one of said ends in a leading position.

11. Means for supplying and orienting elongate articles having different transverse dimensions at the ends thereof and feeding them to a receiver in a predetermined oriented position comprising a hopper to receive a plurality of stacked articles in side-by-side relation with the different ends thereof disposed at random; means feeding said articles from said hopper; segregating means comprising opposed U-shaped guide channels for receiving the ends of said fed articles, each of said channels having a center portion to receive the ends of smaller diameter and an outwardly spaced surface on each side of the center portion to receive the ends of larger diameter, the spacing between the center portion of one guide channel and said outwardly spaced surface of the other guide channel being in excess of the length of said articles thereby longitudinally displacing the articles with respect to the center of the space between said guide channels in accordance with the end dimensions; vertical guide channels receiving said segregated articles; means engaging and advancing the segregated articles carried by said guide channels to an orienting station; and means in the orienting station including an orienting head engaging the segregated articles and moving them in a predetermined path depending upon the longitudinal displacement thereof to feed said articles to a receiver with a predetermined one of said ends in a leading position.

12. Means for supplying and orienting elongate articles having different transverse dimensions at the ends thereof and feeding them to a receiver in a predetermined oriented position comprising a hopper to receive a plurality of stacked articles in side-by-side relation with the different ends thereof disposed at random; means delivering said articles from the hopper one at a time; segregating means including oposed guide channels receiving the fed articles and longitudinally displacing them therein in accordance with the end dimensions; means advancing the segregated articles to an orienting station; and means in the orienting station including an orienting unit rotatable on a shaft parallel to a plane containing said guide channels, said unit having an oscillating orienting head movable about an axis located in a plane perpendicular to said first plane and having gripper means to engage and grip the segregated articles, said head being urged to a predetermined article engaging position by urging means, means at said orienting station engaging the longitudinally displaced end of the gripped article to retard movement thereof by the rotation of the unit whereby the head is initially turned on the said axis against said urging means in a predetermined direction depending upon the longitudinal displacement of the segregated article, said unit having means for continuing turning of the head against said urging means through 90° incident to the rotation of the unit and carrying the article to a position with said predetermined end aligned with a receiver, means for releasing the article from the gripping means and into said receiver, and means releasing the head to return to said normal position.

13. An orienting means for receiving elongate articles segregated and longitudinally displaced in accordance with a predetermined characteristic of the article and fed thereto in a predetermined plane comprising an orienting unit on a driven shaft disposed parallel to the plane containing said segregated articles, said unit having an oscillating orienting head movable about an axis located in a plane perpendicular to said first plane and having gripper means to engage and grip the segregated articles, said head being urged to a predetermined article engaging position by urging means; abutments for engaging the displaced ends of the gripped articles as the unit is initially turned by the shaft and causing the head to initially turn on the said axis against said urging means in a predetermined direction depending upon the position of the displaced article, said unit having means for continuing turning of the head against said urging means through a substantial angle incident to the rotation of the unit and carrying the article to a position with a predetermined end of the article aligned with a receiver; and means for releasing the article from the gripping means in said aligned position and releasing the head to return to said normal position by the urging means.

14. Means for supplying and orienting elongate articles having different transverse dimensions at the ends thereof and feeding them to a receiver in a predetermined oriented position comprising a hopper to receive a plurality of horizontally disposed articles in side-by-side relation with the different ends thereof located at random, said hopper having an outlet opening in the bottom; means comprising a driven paddle wheel adjacent said outlet opening to deliver said articles from the hopper one at a time; segregating means comprising opposed U-shaped guide channels for receiving the ends of said fed articles, each of said channels having a center portion to receive the ends of smaller diameter and an outwardly spaced surface on each side of the center portion to receive the ends of larger diameter, the spacing between the center portion of one guide channel and said outwardly spaced surface of the other guide channel being equal to the length of said articles thereby longitudinally displacing the articles with respect to the center of the space between said guide channels in accordance with the end dimensions; vertical guide channels for said segregated articles; means engaging and advancing the segregated articles carried by said vertical guide channels to an orienting station; and means in the orienting station including an orienting unit rotatable on a shaft parallel to a plane containing said guide channels, said unit having an oscillating orienting head movable about an axis located in a plane perpendicular to said first plane and having gripper means to engage and grip the segregated articles, said head being urged to a predetermined article engaging position by urging means, means at said orienting station engaging the longitudinally displaced end of the gripped article to retard movement thereof by the rotation of the unit whereby the head is initially turned on the said axis against said urging means in a predetermined direction depending upon the longitudinal displacement of the segregated article, said unit having means for continuing turning of the head against said urging means through 90° incident to the rotation of the unit and carrying the article to a position with said predetermined end aligned with a receiver, and means for releasing the article from the gripping means and into said receiver and the head to return to said normal position.

15. Means for supplying and orienting a plurality of bobbins having the butt and tip ends thereof of different diameters and feeding them to a receiver in a predetermined oriented position comprising a vertical hopper to receive a plurality of stacked bobbins in horizontal side-by-side relation with the tip and butt ends thereof disposed at random; means delivering said bobbins from the hopper one at a time; segregating means including opposed guide channels receiving the fed bobbins and longitudinally displacing them therein in accordance with the end diameters; means advancing the segregated bobbin to an orienting stations; and means in the orienting station including an orienting head engaging the segregated bobbins and moving them in a predetermined path depending upon the longitudinal displacement thereof to feed said bobbins to said receiver with a predetermined one of said ends in a leading position.

16. Means for supplying and orienting a plurality of elongate bobbins having different diameters at the ends thereof and feeding them to a receiver in a predetermined oriented position comprising a vertical hopper having a width to receive a stacked supply comprising a plurality of horizontally disposed bobbins in side-by-side relation with the different ends thereof located at random, said hopper having an outlet opening in the bottom and a rotary bobbin feeding means in the bottom of the hopper for feeding the bobbins toward said opening; means comprising a driven paddle wheel adjacent said outlet opening to receive bobbins therefrom and deliver said bobbins one at a time to a segregating means, said segregating means comprising opposed guide channels having cam means disposed adjacent the ends of said paddle wheel for engaging the ends of said bobbins and longitudinally displacing the bobbins relative to the center between said guide channels in accordance with the end diameters of said bobbins; opposed vertical guide channels for receiving the segregated bobbins, each of said vertical channels having a center portion to receive the ends of smaller diameter and an outwardly spaced surface on each side of the center portion to receive the ends of larger diameter, the spacing between the center portion of one guide channel and said outwardly spaced surface of the other guide channel being in excess of the length of said articles; a driven conveyor means engaging and advancing the segregated bobbin carried by said guide channels to an orienting station; and means in the orienting station including an orienting head engaging the segregated bobbins and moving them in a predetermined path depending upon the segregation thereof to feed said bobbins to said receiver with a predetermined one of said ends in a leading position.

17. The invention as defined in claim 16 wherein a rotary bobbin engaging element is disposed in the hopper adjacent and above the rotary bobbin feeding means and is rotated in a direction counter to the rotation of said bobbin feeding means to prevent the stacked bobbins from jamming the bobbin feeding means.

18. Means for supplying and orienting elongated bobbins having different diameters at the ends thereof and feeding them to a receiver in a predetermined oriented position comprising a hopper to receive a plurality of stacked bobbins in side-by-side relation with the different ends thereof disposed at random; feeding means feeding said bobbins one at a time from said hopper; segregating means for the bobbins comprising opposed U-shaped guide channels adjacent said feeding means for receiving the ends of said fed bobbins, said U-shaped guide channels having cam means cooperating with the ends of the bobbins and longitudinally displacing the bobbins with respect to the center of the space between said guide channels and segregating them in accordance with the end diameters, said segregated bobbins being received and guided in segregated position by vertical guide channels, each of said vertical channels having a center portion to receive the ends of smaller diameter and an outwardly spaced surface on each side of the center portion to receive the ends of larger diameter, the spacing between the center portion of one guide channel and said outwardly spaced surface of the other guide channel being in excess of the length of said bobbins; means engaging and advancing the segregated bobbins carried by said vertical guide channels to an orienting station; and means in the orienting station including an orienting head engaging the segregated articles and moving them in a predetermined path depending upon the longitudinal displacement thereof to feed said articles to said receiver with a predetermined one of said ends in a leading position.

19. An orienting means for receiving elongate bobbins having different diameters at the ends thereof which are segregated and longitudinally displaced in accordance with said different diameters, which segregated bobbins are fed thereto in a predetermined plane comprising an orienting unit on a driven shaft disposed parallel to the plane containing said segregated bobbins, said unit having an oscillating orienting head movable about an axis located in a plane perpendicular to said first plane and having gripper means to engage and grip the segregated bobbins, said head being urged to a predetermined bobbin engaging position by urging means; abutments for engaging the displaced ends of the gripped bobbin and, as the unit is initially turned by the shaft, causing the head to to be rotated thereby and initially turn on the said axis against said urging means in a predetermined direction depending upon the position of the displaced bobbin, said unit having means for continuing turning of the head against said urging means through 90° incident to the rotation of the unit and carrying the bobbin to a position with a predetermined one of said ends aligned with a receiver; and means for releasing the bobbin from the gripping means in said aligned position and releasing the head to return to said normal position by the urging means.

References Cited
UNITED STATES PATENTS

| | | | |
|---|---|---|---|
| 2,771,191 | 11/1956 | Kath | 221—158 X |
| 2,873,841 | 2/1959 | Smith | 198—31 |
| 2,974,773 | 3/1961 | Vaughan et al. | 198—33 |
| 2,997,202 | 8/1961 | Madeux | 221—173 X |
| 3,077,725 | 2/1963 | Du Buis et al. | 57—53 |
| 3,164,946 | 1/1965 | Du Buis et al. | 57—53 |

FOREIGN PATENTS 740,966   11/1955   Great Britain.

FRANK J. COHEN, *Primary Examiner.*

J. PETRAKES, *Assistant Examiner.*